Jan. 30, 1940.  E. L. ANDERSON  2,188,547
DUST COLLECTOR
Filed March 9, 1937  4 Sheets-Sheet 4

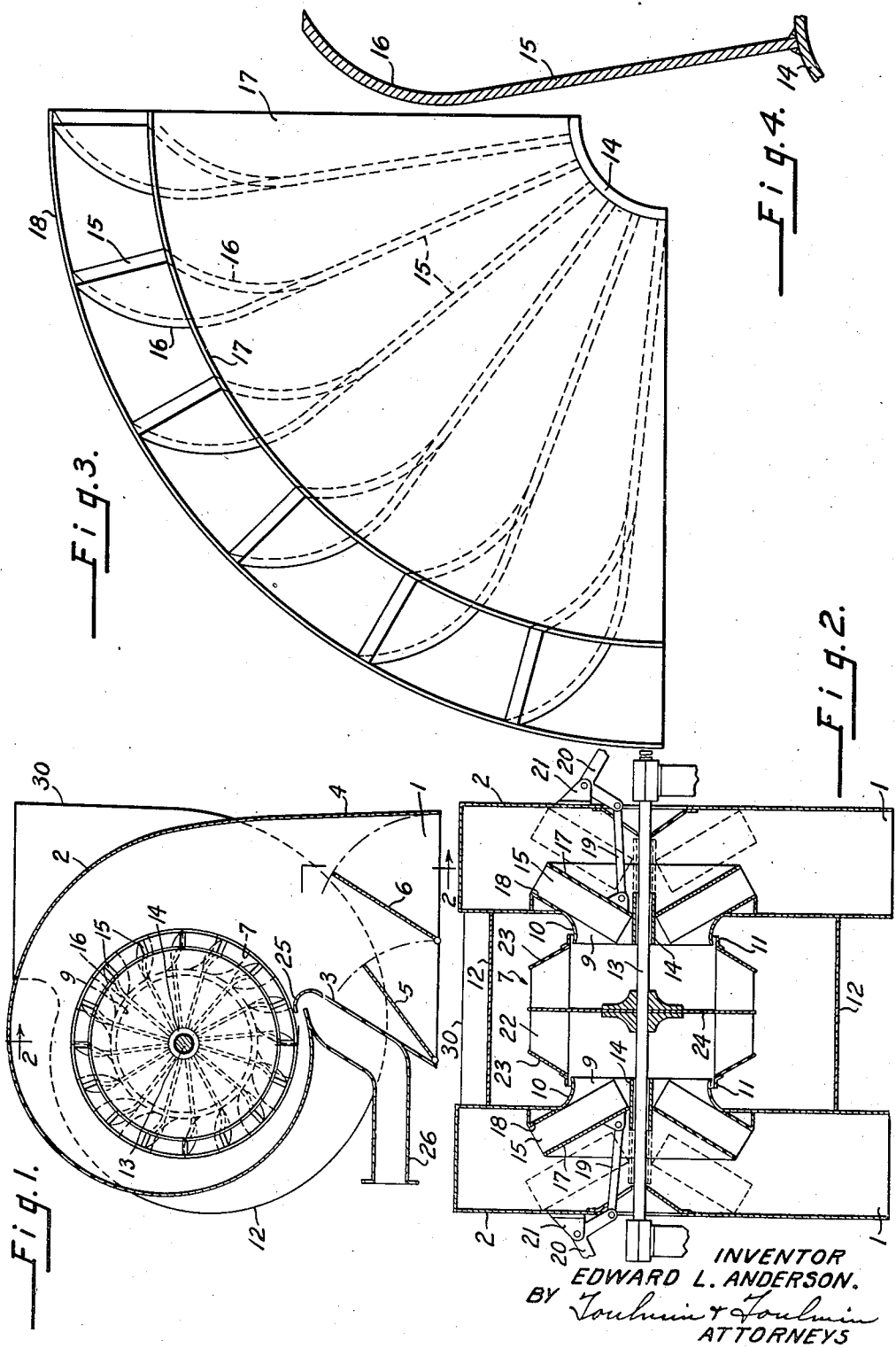

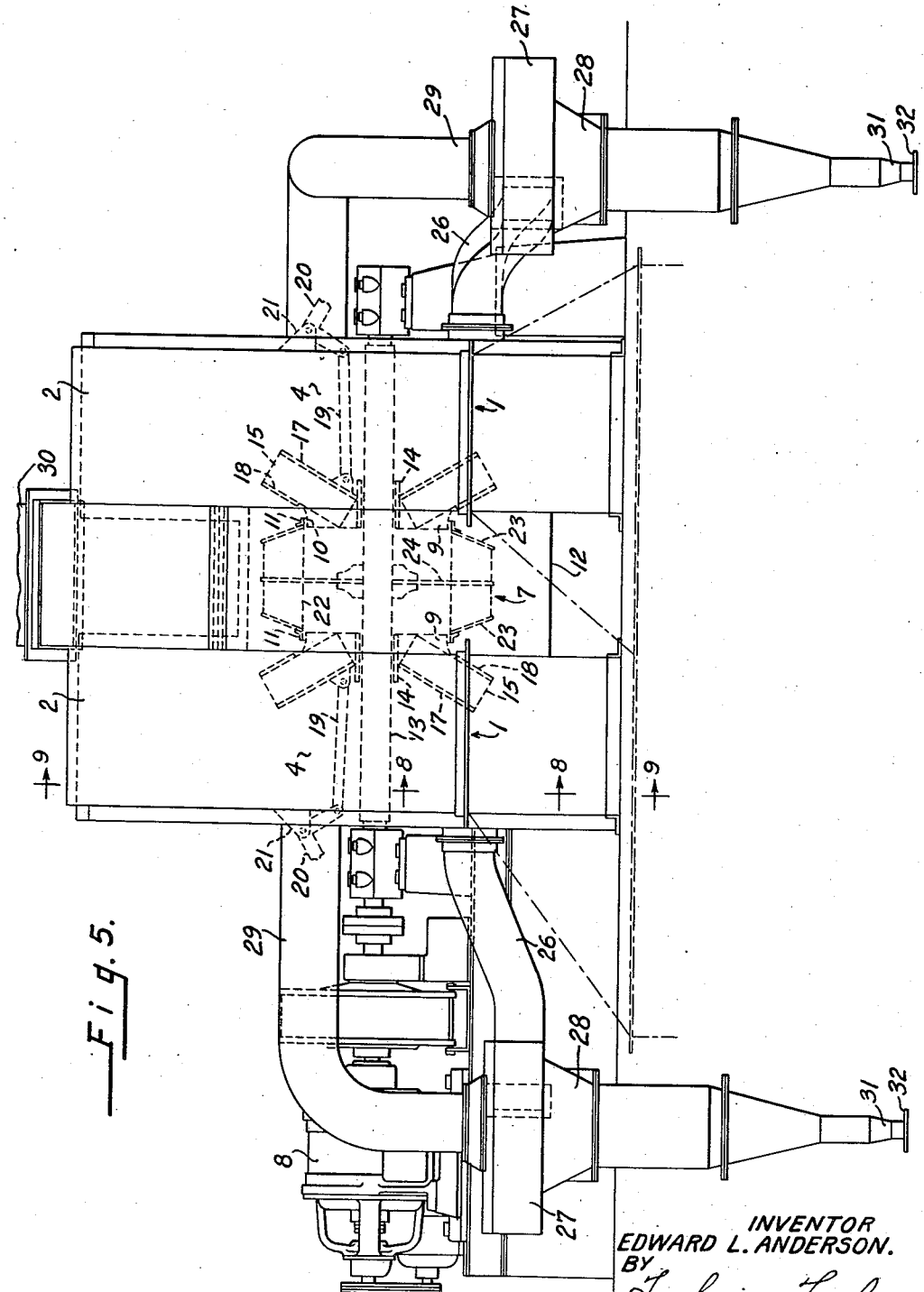

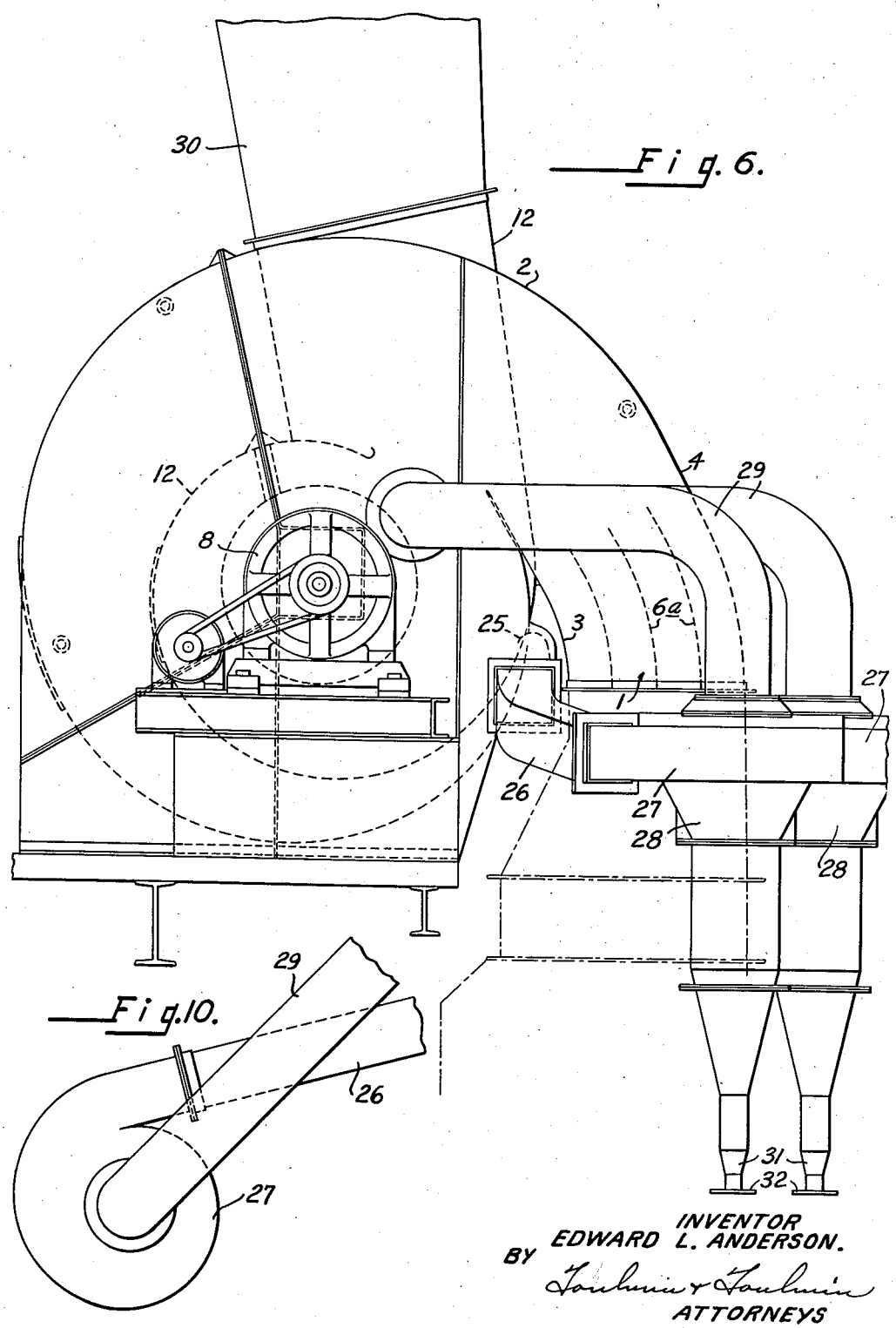

INVENTOR
EDWARD L. ANDERSON.
BY
ATTORNEYS

Patented Jan. 30, 1940

2,188,547

UNITED STATES PATENT OFFICE 2,188,547

DUST COLLECTOR

Edward L. Anderson, Detroit, Mich., assignor to American Blower Corporation, Detroit, Mich., a corporation of Delaware Application March 9, 1937, Serial No. 129,879

6 Claims. (Cl. 230—114)

My invention relates to the control of the volume of air delivered by a constant speed fan by adjusting the whirling component of the entering air.

It is my object to provide the combination of a fan, dust collector, and means of adjusting the entering and exit movement of the air so as to adjust the dust collector and fan to the most advantageous conditions for dust collection and for controlling the volume of air that is delivered in dust free condition.

It is a further object of my invention to provide the combination of vortex entrance dust collection chambers in association with a fan and with means for skimming the dust laden air from the primary dust collection vortex chambers and of controlling the initial whirl of the air into the vortex primary chambers and the whirl of the air leaving the vortex chambers and entering the fan; and to provide in such a combination as a further step in the organization of parts secondary collectors for a further separation of the entrained air in the dust removed from the primary vortex collection chambers.

Referring to the drawings:

Figure 1 is a vertical section through the primary vortex chamber, the entrance air directing vanes, and the collecting lip for collecting the dust laden air that is delivered to the secondary collector.

Figure 2 is a section on the line 2—2 of Figure 1 showing in detail the arrangement of the fan, the vortex chambers on either side thereof, and the means of varying the whirl of the air leaving the vortex chambers and entering the fan.

Figure 3 is one-quarter of the mechanism employed for directing the air with a predetermined whirl from the primary vortex collection chambers into the eye of the fan.

Figure 4 is a section through one of the vanes illustrated in Figure 3 for directing the air from the primary vortex chambers to the fan.

Figure 5 is a front elevation of the assembled vortex chambers on either side of the fan and the secondary collectors connected to each of the vortex chambers, with their outlets connected to the vortex chambers.

Figure 6 is a side elevation of the structure shown in Figure 5.

Figure 10 is a top plan view of the secondary vortex collector, its tangential inlet pipe, and its central delivery exit pipe.

Figure 7:
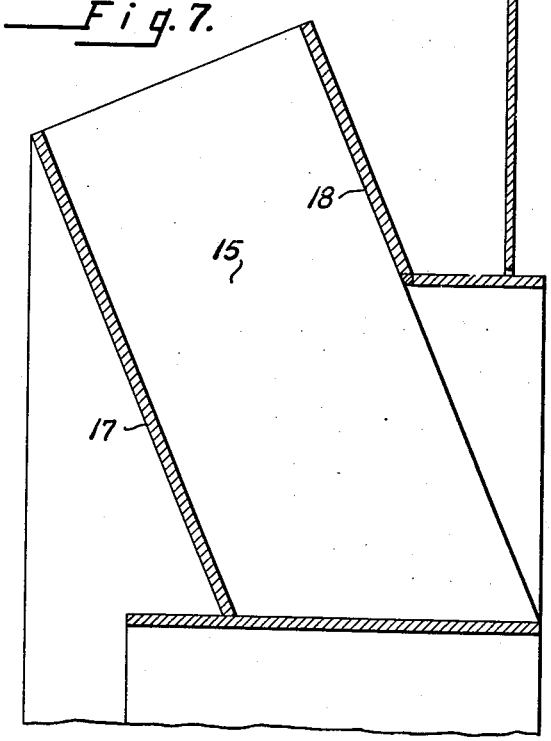
Figure 7 is a vertical section showing a modification of the vane structure.

Referring to the drawings in detail, I designates the air inlet passageway tangentially disposed with respect to the primary vortex chamber 2, which constitutes the space of preliminary whirl of the entering dust laden air. This vortex chamber is relatively narrow, as indicated in Figure 2. The throat I constituting the entrance passageway is restricted by the tapering walls 3 and 4. The dampers or guide vanes 5 and 6 are adjustable to direct the air into the whirl desired within the primary vortex chamber in order to control the volume and direction of the air entering the preliminary whirl space and to control thereby the volume of air delivered by the fan 7, which is driven at a constant speed by the motor 8.

This primary vortex chamber has an eccentric eye constituting the exit port, which is designated 9. This eye is formed by a Venturi shaped throat 10 that extends inwardly in spaced overlapping relationship to the flange 11 of the fan 7. The overlapping portions of the Venturi throat 10 and the marginal flange 11 of the fan are in substantially parallel relationship and are closely adjacent so as to provide for the re-entry of air from the fan casing 12 after the air has been thrown out by the fan 7. The fan casing 12 is a vortex chamber in which the fan is located eccentrically of the chamber.

Mounted within the Venturi throat 10 slidably upon the fan shaft 13 is a sleeve 14. This sleeve carries a plurality of blades 15 which are diagonally and radially disposed with respect to the shaft 13. The outer ends of the blades are curved as at 16. The blades are secured edgewise to a conically-shaped member 17 and at their opposite edges abut a conical wall 18 which forms a continuation of the throat 10.

The entire unit comprising the conical wall 17 and the blades or guide vanes is adapted to slide inwardly and outwardly on the supporting sleeve 14 which moves on the axle 13 by reason of the pitman 19 connected to the bell crank 20. The bell crank 20 is pivotally supported on the vortex chamber 2 by the bracket 21. The particular form of adjusting mechanism is not important. For the purpose of clarity the adjusting mechanism as shown is sufficient to illustrate the principle of operation. The inward and outward movement of the blades 15 is as indicated in full lines and dotted lines.

The fan 7 consists of the blades 22, the shrouds 23 and a center plate 24 which supports the blades and shrouds on the axle 13.

The vortex chamber 2 which is a primary dust collection chamber is provided with a dust collection lip 25 which is located at that point which is closest to the eye 9 of the fan, that is, the exit opening from the primary vortex chamber 2 to the fan chamber 12. This dust collection lip skims the dust thrown out centrifugally in the primary vortex collection chamber and delivers it into the passageway 26 which leads to the secondary vortex chamber 27, whence the dust descends into the collection chamber 28 while the dust free air rises through the center of the secondary collector and makes its exit through the pipe 29 into the primary vortex chamber 2 or into the outlet passageway 30 leading from the fan casing 12. The dust so collected makes its exit from the hopper 31 upon opening the slide 32.

Figure 8:
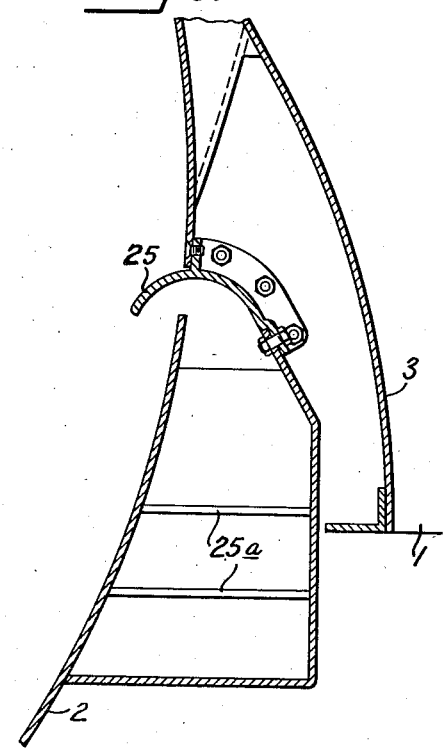
Figure 8 is a section on the line 8—8 of Figure 5 showing the detailed arrangement of the collector lip of a modified form for collecting the dust laden air from the primary vortex chamber to direct it to the secondary vortex chamber.
Figure 9:
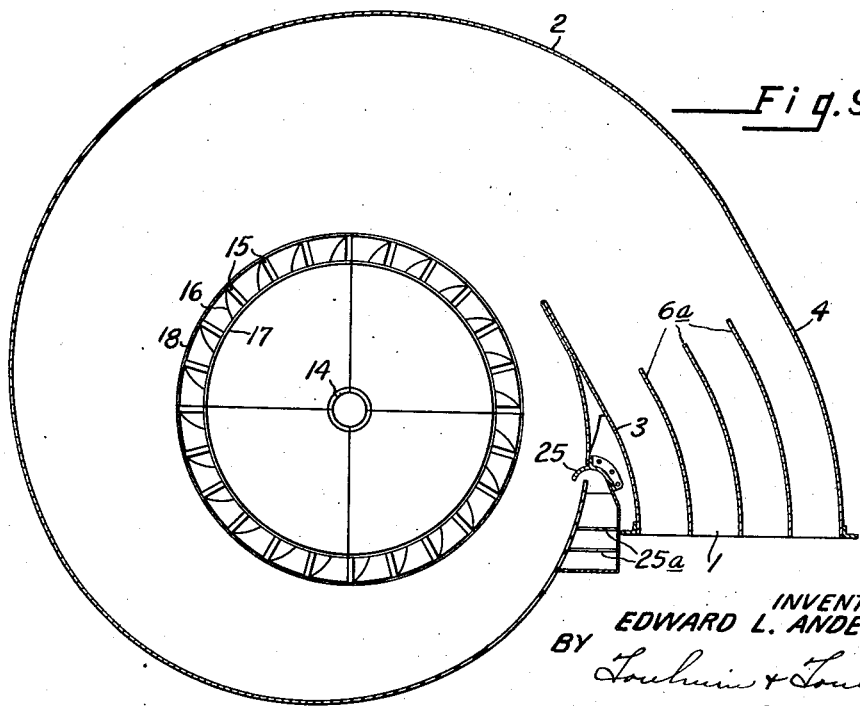
Figure 9 is a section on the line 9—9 of Figure 5 showing the guide vanes which may or may not be adjustable in the inlet of the primary vortex chamber.

As illustrated in Figures 8 and 9, the dust collection lip 25 may be associated with guide vanes 25a to facilitate the directing of the dust laden air to the secondary vortex chamber.

If desired, stationary vanes such as shown in Figure 9 at 6a may be employed instead of the movable vanes 5 and 6.

*Operation*

In operation, the dust laden air is drawn into the primary vortex chamber 2 by the action of the fan 7. The position of the blades 5 and 6 control the volume and direction of the air entering the preliminary whirl space 2 of the apparatus and therefore the volume of air that will be delivered by the constant speed fan. The positioning of the dampers 5 and 6 has an additional advantage in that it tends to throw the body of the air against the inside of the outer wall of the vortex chamber 2 so as to facilitate dust collection by the lip 25. The main body of dust with some air entrained is then delivered into the secondary vortex collector 27, whence it receives its final movement and the dust free air is extracted through the pipe 29.

The volume of air delivered by the fan is controlled, without changing the speed of the fan by adjusting the dampers 5 and 6 to vary the volume and direction of the air entering the preliminary whirl space 2 and also by controlling the amount of whirl imparted to the air as it is delivered from the vortex chamber 2 to the fan casing 12 by adjusting the positions of the blades 15 along the shaft 13. When the conical walls 17 and blades 15 are in the solid-line position of Figure 2, the minimum volume of air is delivered from the vortex chamber 2 to the fan throat 9. When, however, this structure is shifted axially into the dotted-line position thereof, the maximum volume of air is so delivered. By shifting this structure to an intermediate position, an air volume of intermediate value is delivered, lying between these minimum and maximum values. By reason of the conical shape of the passageway between the walls 17 and 18 and the tapering or wedge-shape of the spaces between the blades 15, the valve arrangement shown operates in the most efficient manner, that is, without eddy or turbulence loss, to change the direction of the swirling air in the vortex chamber to the axial direction required by the fan. This efficacy of air redirection is in nowise affected by the axial movement of the valve, since the passageways always bear substantially the same directional relationship with respect to the incoming and outgoing air. The several axial positions of the valve present the entrance point of the passageways to air currents of different pressure; they also control the amount of added whirl given the air currents to prevent vacuum areas, etc. and, in addition, permit variable amounts of air to pass between the outer cone 18 and the inner wall of each vortex chamber.

It is therefore possible by this combination to control both the dust collection and the air volume, which are interrelated, so as to bring about the most efficient dust collection according to the volume of air being handled while maintaining a constant fan speed.

It will be understood that I desire to comprehend within my invention such modifications as come within the scope of the claims and the invention.

Having thus fully described my invention, what I claim as new and desire to secure by Letters Patent, is:

1. In combination, a fan, a vortex chamber, and means for adjustably controlling the volume of air leaving the vortex chamber and entering the fan, said adjustable means including at least one passageway formed by a plurality of walls fixed with relation to each other, the passageways formed by the fixed walls being adjustably movable axially of the fan across said vortex chamber.

2. In combination, a fan, a vortex chamber, means for adjustably controlling the volume of air leaving the vortex chamber and entering the fan, and means for directing the air entering the vortex chamber against the outer wall thereof away from said volume-controlling means, said volume-controlling means including a plurality of passageways, the walls of each of said passageways being fixed with relation to each other, the passageways formed by the fixed walls being axially movable of said fan across said vortex chamber.

3. In combination, a vortex chamber with an inlet passageway, a dust-collecting lip projecting therein, means for directing the incoming dust-laden air obliquely to the inlet passageway in the vortex chamber toward the outer wall thereof and to control the volume thereof, a fan chamber with a fan therein communicating with the vortex chamber, said fan having a shaft, and means adjustably mounted in the passageway between the vortex chamber and the fan chamber for additionally controlling the direction of the air leaving the vortex chamber, said means including a plurality of passageways formed by walls, said walls being fixed with relation to each other and certain of said walls comprising curved blades, said means being adjustable longitudinally of the fan shaft.

4. In combination, an inlet dust collection vortex chamber, adjustable dampers in the inlet thereof for directing the dust-laden air towards the outer wall of the vortex chamber, said vortex chamber having an outlet eye, an adjustable unit comprising a plurality of movably adjustable guide vanes mounted in said outlet eye, said adjustable unit further including a wall movable with respect to said vortex chamber to which one edge of each guide vane is secured, the opposite edge of each vane being adapted to abut a portion of said chamber, a second vortex chamber in communication with said eye, a fan therein, and means for directing the air into the fan through a Venturi throat from the first vortex chamber into the second vortex chamber, said dampers being arranged to direct said incoming dust-laden air away from said guide vanes.

5. In combination, two air passageways extending in different directions, a blower in one of the passageways, means for directing air from one passageway to the other passageway, said means comprising a plurality of frusto-conical members positioned between the passageways, said members being superimposed on one another in spaced relation to provide an annular space between each pair of members which receives air at its outer peripheral boundary and delivers the air at the central boundary to one of said passageways, said space being divided into air compartments by a plurality of walls, one of said frusto-conical members being movable with respect to said passageways and the other frusto-conical member being fixed with respect to said passageways, one edge of said walls being secured to one of said frusto-conical members and the opposite edge of said walls being adapted to abut the other of said frusto-conical members during the relative movement of these members.

6. In combination, two air passageways extending in different directions, a blower in one of the passageways, one of said passageways being of circular configuration, means for directing air from one passageway to the circular passageway, said means comprising a plurality of frusto-conical members forming part of one of the passageways, said members being superimposed on one another in spaced relation to provide an annular space between said members, said space being adapted to receive the air at its outer peripheral boundary and to deliver the air at the central boundary of the space to the circular passageway, one of said members being movable with respect to said passageways so as to present the entrance to the annular space to different sections of the flowing air, said movable member carrying a plurality of walls which extend toward the other member and are adapted to abut said other member when the movable member is moved to a predetermined position.

EDWARD L. ANDERSON.